United States Patent [19]
Smith

[11] Patent Number: 5,941,712
[45] Date of Patent: Aug. 24, 1999

[54] EDUCATIONAL KIT

[76] Inventor: Laura Janene Smith, 677 Redwood Rd., San Anselmo, Calif. 94960

[21] Appl. No.: 08/959,010

[22] Filed: Oct. 28, 1997

[51] Int. Cl.$^6$ .............................. G09B 25/00; A63H 3/16; A63F 9/10
[52] U.S. Cl. ....................... 434/365; 446/97; 273/157 R
[58] Field of Search .............................. 446/97, 373, 104, 446/70, 144, 86; 273/153 R, 157 R; 434/299, 406, 433, 378

[56] References Cited

U.S. PATENT DOCUMENTS

| | | | |
|---|---|---|---|
| D. 257,370 | 10/1980 | Kodaka | D21/1 |
| D. 257,371 | 10/1980 | Kodaka | D21/1 |
| D. 257,372 | 10/1980 | Kodaka | D21/1 |
| D. 257,373 | 10/1980 | Kodaka | D21/1 |
| 2,451,711 | 10/1948 | Beder | 446/70 |
| 3,047,979 | 8/1962 | Hrucz | 446/144 |
| 4,571,198 | 2/1986 | Barbato et al. | 446/73 |
| 5,061,219 | 10/1991 | Glickman | 446/120 |
| 5,312,286 | 5/1994 | Domen | 446/187 |
| 5,404,661 | 4/1995 | Sahm et al. | 37/348 |
| 5,429,541 | 7/1995 | Landon | 446/70 |
| 5,480,341 | 1/1996 | Plakos | 446/373 |
| 5,518,434 | 5/1996 | Ziegler | 446/121 |
| 5,653,337 | 8/1997 | Cirigliano | 206/373 |
| 5,681,041 | 10/1997 | Coon | 273/157 R |
| 5,752,869 | 5/1998 | Huff | 446/104 |

OTHER PUBLICATIONS

Sunglo Summer Play sand toy advertisement, Feb. 14, 1997.
Quicksand Amazing Activity Sand advertisement, Feb. 16, 1996.
Sears Christmas catalog advertisement of G.I. Joe Adventure Team–Recovery of the Lost Mummy, Dec. 1974.

*Primary Examiner*—Gene Mancene
*Assistant Examiner*—Michael B. Priddy
*Attorney, Agent, or Firm*—Dergosits & Noah LLP

[57] ABSTRACT

A kit provides one or more replicas of dinosaur skeletons (typically significantly reduced in size), in combination with one or more replicas of paleontology tools (again typically significantly reduced in size) such as those that might be used in the actual exploration for and excavation of dinosaur skeletons by paleontologists in the field. The dinosaur skeleton and tool replicas may be carried in a pail or backpack with the tools organized in separate compartments or pockets.

23 Claims, 3 Drawing Sheets

EDUCATIONAL KIT

BACKGROUND OF THE INVENTION

1. Field of the Invention

This invention relates generally to educational and entertainment materials, and more specifically to an improved educational kit providing replicas of dinosaur skeletons and paleontology tools for use by children to mimic paleontological activities.

2. Description of the Prior Art

Known educational materials used to teach children about the science of paleontology typically include books, movies, and related audiovisual works. However, no known educational materials provide children with hands-on experiences in the types of activities and equipment that might be used in the actual exploration for and excavation of dinosaur skeletons by paleontologists in the field.

SUMMARY OF THE INVENTION

The educational kit of this invention provides one or more replicas of dinosaur skeletons (typically significantly reduced in size), in combination with one or more replicas of paleontology tools (again typically significantly reduced in size) such as those that might be used in the actual exploration for and excavation of dinosaur skeletons by paleontologists in the field. The dinosaur skeletons, tools, and associated materials may be organized and housed in a variety of ways, including but not limited to being carried in a bucket or pail (where the tools may be hung on the inside of the pail in compartmentalized casings); in a bag or backpack (where the tools may be carried in separate pockets or sleeves), or in any other manner.

DETAILED DESCRIPTION OF A PREFERRED EMBODIMENT

Figure 1:
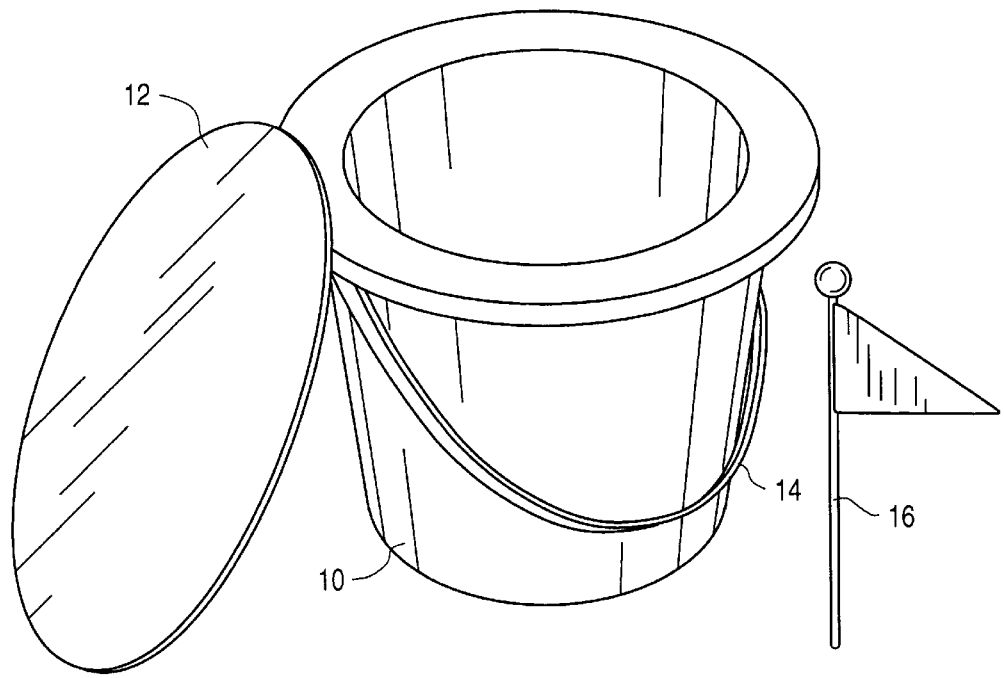
FIG. 1 illustrates a bucket-type container that may be used with the educational kit of this invention.

FIG. 1 illustrates a bucket-type container 10 that may be used with the educational kit of this invention. The dimensions of the bucket or pail may be ten inches diameter at the top and seven inches at the bottom, with a circumference of twenty-six inches, and a height of nine inches. The sieve lid 12 snaps on top of the pail. The handle 14 of the pail snaps off so that additional items contained in a plastic netted bag with a drawstring can slip on the handle. There may be one or more ten inch plastic marker flags 16 with rounded balls at the top for safety.

Figure 2:
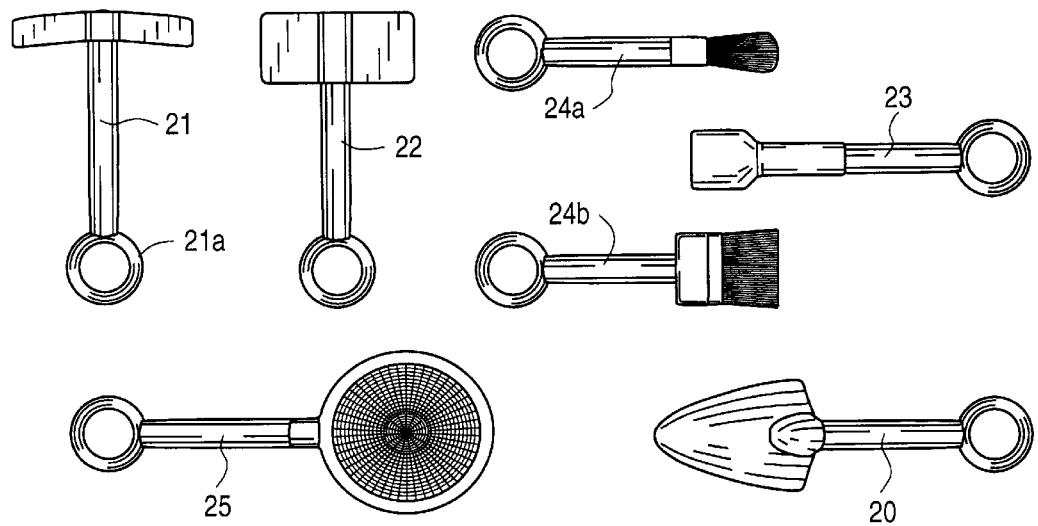
FIG. 2 illustrates examples of some of the paleontological tool replicas that may be used with this invention.

FIG. 2 illustrates examples of some of the paleontological tool replicas that may be used with this invention. The tool replicas may vary in size from six to ten and one-half inches. The paleontology tools may include the following:

A small lightweight spade 20 for digging out loose material.

A geological hammer 21, with one square end and a pick end or chisel at the other. It may include a long loop of cord with a knot. The loop is threaded through a hole 21a in the end of the handle, so that it can be wound double around your chest and shoulder for carrying, and looped singly while working, to prevent dropping and losing the hammer.

A lump or club hammer 22. This may be useful for hitting chisels, but this is usually too heavy to carry long distances. Other possibilities are a small chipping hammer or a large rock hammer.

A stonemason's chisel 23, or a variety of such chisels of assorted blade widths from ¼–2 in. (0.5–5 cm), for working around a fossil.

One or more brushes 24a, 24b, or an old toothbrush or shaving brush, for removing loose rock.

A strainer 25 for removing small fossils from friable sand or clay, or for washing a specimen in a stream or lake.

Other tools (not illustrated) which may be used include but are not limited to:

A rock saw.

A small trowel or an old knife to scrape away soft rock.

A magnifying glass.

Note paper (e.g., 4×6 pads).

Maps.

A compass.

Flashlight.

Letters for names.

Information card with picture of dinosaur.

A book about Paleontology.

Figure 3:
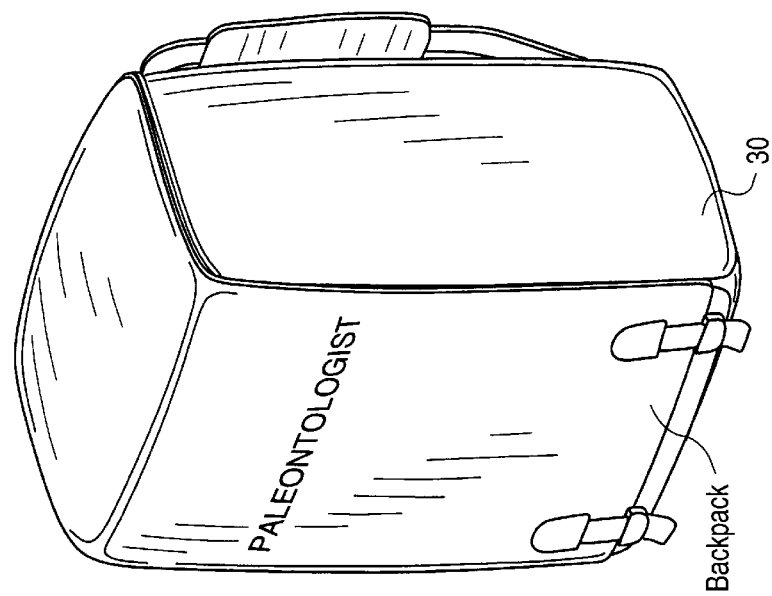
FIG. 3 illustrates a backpack-type container that may be used with this invention.

FIG. 3 illustrates a backpack-type container 30 that may be used with this invention. The backpack should be made of vinyl or other washable material. It can accommodate the tools, dinosaur skeleton(s), and an eight inch sieve if it has the appropriate dimensions of height—twelve or thirteen inches with flap down, and the circumference may be twenty five inches at the base. A laminated card giving a description and history of the items and a description of the science may be included. Other items could include a beverage container, hat or visor, T-shirt and lunch box.

Figure 4:
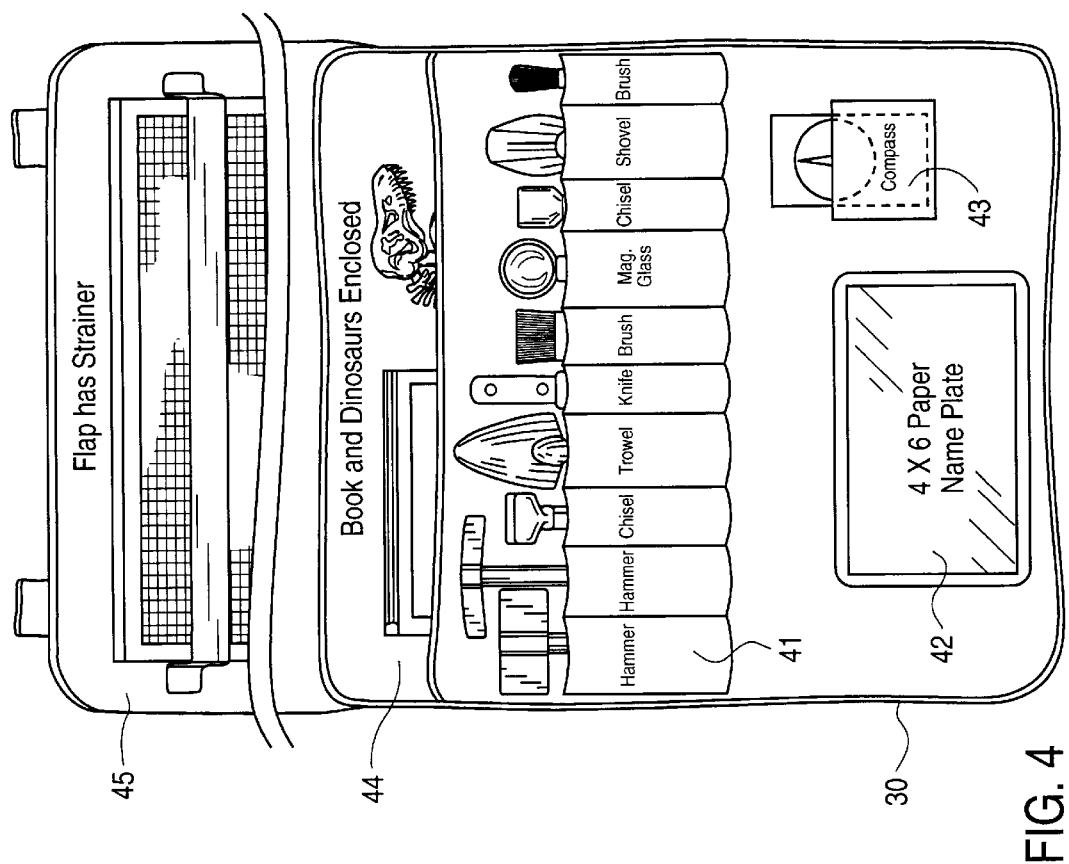
FIG. 4 illustrates a possible arrangement of tool replicas and associated materials within a backpack-type container.

FIG. 4 illustrates a possible arrangement of tool replicas and associated materials within a backpack-type container 30. The tools may be carried in separate pockets or sleeves 41, a name card can be held in a transparent window sleeve 42, a compass carried in a window sleeve 43, and the dinosaur replica bones and book kept in a main pocket 44. Backpack flap 45 may be used to carry a strainer or other tool.

Figures 5, 5A, 5B:
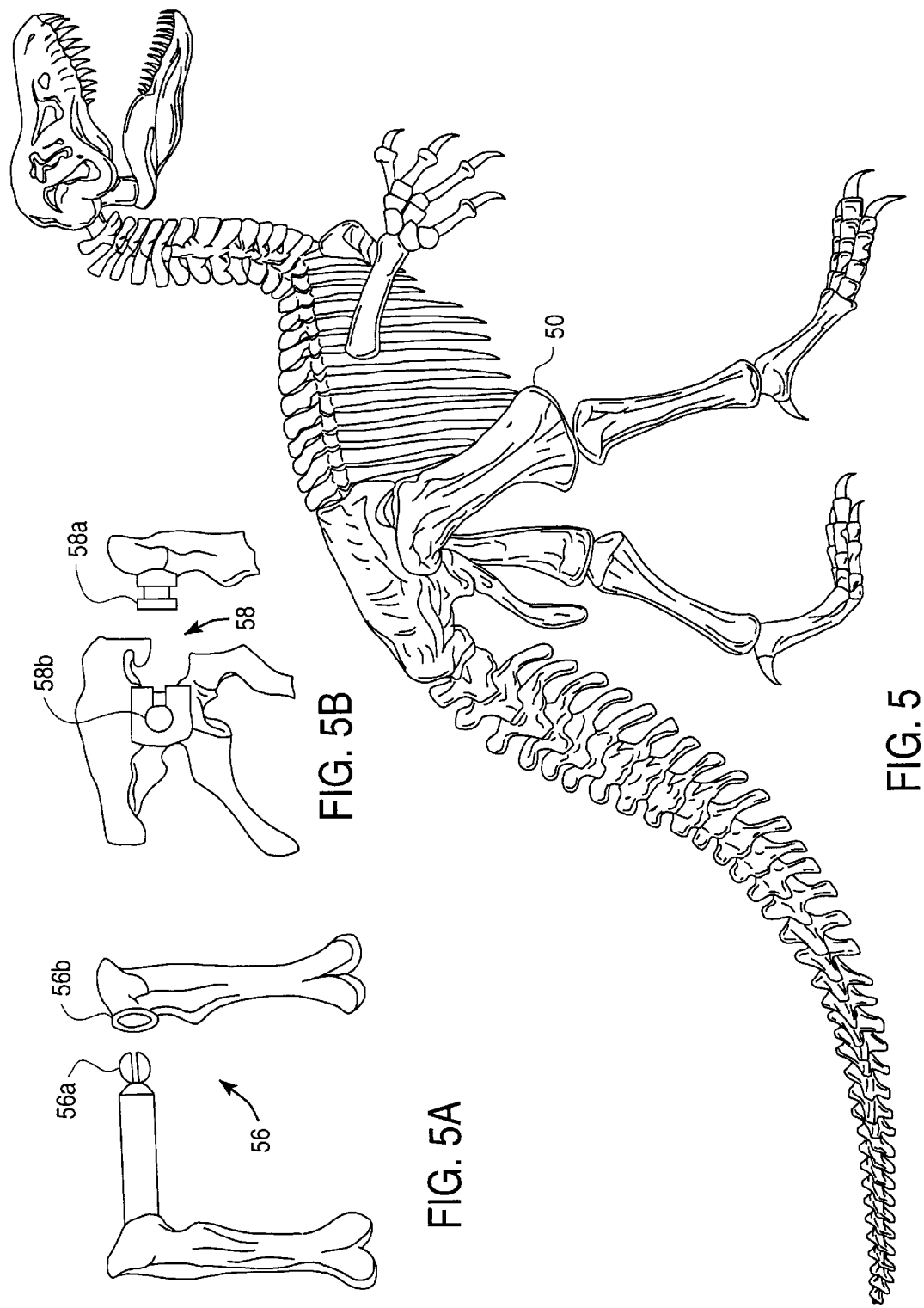
FIG. 5 illustrates a *Tyrannosaurus Rex* skeleton replica of the type that might be used in this invention.
FIG. 5A illustrates a first collapsible ball/socket type of fastener for releasable connection of the dinosaur bone replicas of this invention.
FIG. 5B illustrates an alternate tab/expanding socket type of fastener for releasable connection of the dinosaur bone replicas.

FIG. 5 illustrates a *Tyrannosaurus Rex* skeleton replica 50 of the type that might be used with this invention. The dinosaur skeleton may be approximately twenty inches in length, and made of a plastic or other material with the capacity to glow in the dark. It may be constructed from a plurality of "bone" segments that snap together and apart using hinges, round universal joints (where movement is desired), or square joints (when a secure non-movable attachment is desired).

FIG. 5A illustrates a first type of fastener 56 for releasable connection of the dinosaur bone replica segments of this invention. This fastener utilizes a collapsible ball 56a for insertion into socket 56b.

FIG. 5B illustrates an alternate type of fastener 58 for releasable connection of the dinosaur bone replica segments. This fastener utilizes a tab 58a for insertion into an expanding socket 58b.

Examples of the types of dinosaur skeletons which may be used include but are not limited to: Brontosaurus; *Tyrannosaurus Rex*; Triceratops; Brachiosaurus; Mammoth; Jurassic fish; Orodromeus egg with embryo; Stegosaurus; Carnotaurus (meat eating bull); Triceratops; and Megatherium (Giant Sloth), or any other real or imaginary creature. The skeletons may be constructed to snap apart at the joints (disarticulated) or to be intact (i.e., all in one piece). They can be constructed of plastic or any other suitable material, and be plain or glow-in-the-dark.

Alternate embodiments of the invention may include kits about paleontology, anthropology, archeology, geology and a treasure chest. Such additional kits may be designed to use the original tools that are included in the paleontologist kit, with separate kits and optional collections of kits available in plastic, netted bags with an attachable drawstring. The first four kits give information about each science, while the treasure chest is geared for the younger age group.

The anthropology kit can include the skulls of Austalopithecus Africans, Homo habilis, Homo erectus, Homo sapiens (early), and Homo sapiens. The skulls can snap apart at various bones and can also glow in the dark. The parts of the skull can be defined. A description of anthropology and information about each skull can be included on a laminated card.

The archeology kit can include artifacts about different civilizations. The artifacts may include eating tools, hunting weapons, statues, and art on stones. A description about the science and history of the artifacts are included.

The geology kit includes minerals, ore, and gems. A description of the science and information about the origin of the contents is included on the laminated card.

The treasure chest can be a pirate series for younger children or an oceanography kit for the older children. In today's time and with the new technology of ocean exploration, treasure hunting and locating sunken ships and planes has become a science. The kit may include a treasure chest with gold coins, jewelry and gems. It can be a five by seven or six by eight inch chest that is four to five inches deep (anything significantly bigger might be too cumbersome and difficult to bury). It can include an eye patch, hat, sword, and a treasure map for the pirate version.

The series of kits are designed as "seek and find" games. An adult typically would: 1) choose a safe playing area; 2) mark the boundaries with the flags; 3) hide the contents of the kit in any fashion inside the boundary; 4) upon discovery, the adult could reiterate the educational aspects of the toy.

The games can increase in complexity by having older boys and girls define skeletal parts, names of gems, civilizations of artifacts and history, and information about dinosaurs. The add-on collection of these kits can be endless.

The inventive educational kits are safe, not limited to gender, portable, non-breakable, washable, and ideal for children ages two and up. They may be used at the beach, in a sand box, in snow, and on camping trips, and as a party game. The educational value can also be used in schools.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. An educational kit for teaching paleontology comprising:
   at least one replica of a dinosaur skeleton, wherein said at least one replica of a dinosaur skeleton comprises a plurality of dinosaur bone replica segments more that two of which are connected together with at least one releasable fastener selected from a group comprising: a hinge, a ball and socket, a flange and socket, and a square joint; and
   at least one replica of a paleontology tool;
   a container member for carrying said at least one replica of a dinosaur skeleton and said at least one replica of a paleontology tool.

2. The educational kit of claim 1 further comprising a container member for carrying said at least one replica of a dinosaur skelton and said at least one replica of a paleontology tool.

3. The educational kit of claim 1 wherein said container is selected from a group comprising a pail and a backpack.

4. The education kit of claim 3 wherein said container is said backpack which includes a plurality of separate pockets for carrying said at least one replica of a paleontology tool.

5. The educational kit of claim 1 wherein said at least one releasable fastener are articulation.

6. The educational kit of claim 1 wherein said at least one releasable fastener a collapsible ball adapted for insertion into a socket.

7. The educational kit of claim 1 wherein said releasable fastener comprise a rectangular flange connector adapted for insertion in a mating socket.

8. The educational kit of claim 1 wherein said at least one replica of a paleontology tool includes a spade for digging out loose material.

9. The educational kit of claim 1 wherein said at least one replica of a paleontology tool includes a geological hammer.

10. The educational kit of claim 1 wherein said at least one replica of a paleontology tool includes a chisel.

11. The educational kit of claim 1 wherein said at least one replica of a paleontology tool includes a brush.

12. The educational kit of claim 1 wherein said at least one replica of a paleontology tool includes a strainer.

13. An educational kit comprising:
    at least one dinosaur skeleton replica, wherein said at least one replica of a dinosaur skeleton comprises a plurality of dinosaur bone replica segments connected together with at least one rectangular flange connector adapted for releasable insertion in a mating socket;
    at least one replica of a paleontology tool for excavating said at least one dinosaur skeleton.

14. The educational kit of claim 13 further comprising at least one flag marker for designating an excavation area.

15. The educational kit of claim 13 further comprising a container member for carrying said at least one dinosaur skeleton replica, and said at least one replica of a paleontology tool.

16. The educational kit of claim 15 wherein said container comprises a pail.

17. The educational kit of claim 15 wherein said container comprises a backpack.

18. The educational kit of claim 17 wherein said backpack includes a plurality of separate pockets for carrying said at least one replica of a paleontology tool.

19. The educational kit of claim 13 further comprising at least one card having a description of said at least one replica of a dinosaur skeleton.

20. The educational kit of claim 13 wherein said releasable fasteners comprise a collapsible ball adapted for insertion into a socket.

21. The educational kit of claim 15 wherein said releasable fasteners comprise a flanged connector adapted for insertion into a mating socket.

22. A method for playing a game comprising the steps of:

burying at least one replica of a dinosaur skeleton in an area of soil, wherein said at least one replica of a dinosaur skeleton comprises a plurality of dinosaur bone replica segments connected together with at least one releasable fastener selected from a group comprising; a hinge, a ball and socket, a flange and socket and a square joint; and using at least one replica of a paleontology tool to excavate said at least one replica of a dinosaur skeleton.

23. The method for playing the game of claim 22 further comprising identifying said at least one replica of a dinosaur skeleton by referring to at least one card having a description of said at least one replica of a dinosaur skeleton.

* * * * *